United States Patent
Warschko et al.

(10) Patent No.: US 7,308,509 B2
(45) Date of Patent: Dec. 11, 2007

(54) METHOD FOR CONTROLLING THE COMMUNICATION OF SINGLE COMPUTERS IN A COMPUTER NETWORK

(75) Inventors: Thomas Warschko, Karlsruhe (DE); Joachim Blum, Karlsruhe (DE)

(73) Assignee: ParTec AG, Karlsruhe (DE)

( * ) Notice: Subject to any disclaimer, the term of this patent is extended or adjusted under 35 U.S.C. 154(b) by 662 days.

(21) Appl. No.: 10/220,228

(22) PCT Filed: Feb. 28, 2001

(86) PCT No.: PCT/EP01/02257

§ 371 (c)(1), (2), (4) Date: Aug. 29, 2002

(87) PCT Pub. No.: WO01/65799

PCT Pub. Date: Sep. 7, 2001

(65) Prior Publication Data

US 2003/0041177 A1 Feb. 27, 2003

(30) Foreign Application Priority Data

Feb. 29, 2000 (DE) ................. 100 09 570

(51) Int. Cl.
G06F 15/16 (2006.01)

(52) U.S. Cl. ...................... 709/250; 709/229

(58) Field of Classification Search ............... 709/216, 709/219, 229, 223, 230, 250, 220; 711/111, 711/112

See application file for complete search history.

(56) References Cited

U.S. PATENT DOCUMENTS 5,991,797 A * 11/1999 Futral et al. ............... 709/216

(Continued)

FOREIGN PATENT DOCUMENTS

WO  WO 99 35579 A  7/1999

(Continued)

OTHER PUBLICATIONS

Ogawa et al., "Smart Cluster Network (SCnet): Design of High Performance Communications for SAN", Cluster Computing, 1999, 1st IEEE Computer Society International Workshop on Dec. 2-3, 1999, pp. 71-80.*

(Continued)

Primary Examiner—William Vaughn
Assistant Examiner—Yemane M Gerezgiher
(74) Attorney, Agent, or Firm—Miles & Stockbridge P.C.; Edward J. Kondracki (57) ABSTRACT

A method for controlling the communications of a computer in a computer network or a plurality of single computers in a computer network, in which the computer is connected to other computers and the single computers are connected with each other via a standard network LAN and a high performance network SAN. Each single computer comprises, in an operation system kernel, a protocol unit connected with the standard network LAN for servicing communication protocols and a library, which is connected in front of the operation system kernel, for which applications are sitting at a communication interface. Selection of the communication path between the standard network LAN and the high performance network SAN occurs in a network selection unit integrated with a base library. It is thereby provided that the network selection happens after the communication interface of the library and before access to the operation system kernel. If the network selection happens before access to the operation system, the library can be connected via a communication path with the high performance network SAN, which bypasses the operation system kernel.

5 Claims, 7 Drawing Sheets

U.S. PATENT DOCUMENTS

| | | | | |
|---|---|---|---|---|
| 6,163,525 | A * | 12/2000 | Bentall et al. | 370/227 |
| 6,167,446 | A * | 12/2000 | Lister et al. | 709/223 |
| 6,173,374 | B1 * | 1/2001 | Heil et al. | 711/148 |
| 6,223,270 | B1 * | 4/2001 | Chesson et al. | 711/202 |
| 6,246,683 | B1 * | 6/2001 | Connery et al. | 370/392 |
| 6,349,361 | B1 * | 2/2002 | Altman et al. | 711/121 |
| 6,389,432 | B1 * | 5/2002 | Pothapragada et al. | 707/205 |
| 6,427,173 | B1 * | 7/2002 | Boucher et al. | 709/238 |
| 6,658,469 | B1 * | 12/2003 | Massa et al. | 709/224 |
| 6,742,051 | B1 * | 5/2004 | Bakshi et al. | 719/318 |
| 6,757,291 | B1 * | 6/2004 | Hu | 370/401 |
| 6,760,783 | B1 * | 7/2004 | Berry | 719/318 |
| 6,842,833 | B1 * | 1/2005 | Phillips et al. | 711/162 |
| 6,965,911 | B1 * | 11/2005 | Coffman et al. | 709/201 |
| 2001/0002478 | A1 * | 5/2001 | Grun | 711/114 |
| 2003/0163647 | A1 * | 8/2003 | Cameron et al. | 711/138 |

FOREIGN PATENT DOCUMENTS

| | | | |
|---|---|---|---|
| WO | WO 99 35793 A | | 7/1999 |

OTHER PUBLICATIONS

Warschko et al. "Efficient parallel computing by clustering workstations: Design and evaluation", Journal of Systems Architecture, 44(3-4): 241-260, Dec. 1997. Elsevier Science Inc., New York.*

"Entry Level San Interconnect for Windowsnt Clusters" Research Disclosure, Kenneth Mason Publications, Hampshire 6B, No. 425, Sep. 1999, pp. 1258-1259, XP000889231, ISSN: 0374-4353, Whole Document, Figs. 1,2.

David Garcia & William Watson, "ServerNet™ II," *Parallel Computer Routing and Communication, International Workshop Proceedings*, pp. 119-135 (1997).

Dave Dunning, et. al., "The Virtual Interface Architecture," *IEEE Micro*, vol. 18, No. 2, Mar. 1, 1998, pp. 66-76.

Joachim Mindt, "San: Speicherkonzept für hohe Bitraten," *Nachrichtentechnik Elektronik, DE, VEB Verlag Technik Berlin*, vol. 48, No. 1, 1998, p. 28.

* cited by examiner

METHOD FOR CONTROLLING THE COMMUNICATION OF SINGLE COMPUTERS IN A COMPUTER NETWORK

FIELD OF THE INVENTION

The invention relates to a method for controlling the communication of single computers in a computer network, by which it should be enabled, to use the network of single computers as efficient parallel computer.

BACKGROUND OF THE INVENTION

Single computers or so-called workstation computers, which may be a conventional personal computer (PC) or a workstation, have been highly improved in the last years with regard to their computing speed and therefore computing performance so that a plurality of programs, both in the private and the commercial field, are executable with them. In particular, in the commercial field, for example for organization of medium or big companies, for simulation of application and production sequences, but also in the field of research and science, the computing performances of the PCs having presently the highest performance, however, are not adequate to process the pending amount of data in an economically acceptable time period. Usually, for such computing intensive tasks, so-called large-scale computers have to be accessed, which are however very cost-intensive.

Since a long time, it was tried, by setting up a computer network out of several parallel connected single computers, which are each realized by a common PC, to provide a cost-effective alternative to large-scale computers. Thereby, the single computers usually comprise standard processors which have, contrary to special processors, a better price-performance-ratio and shorter further development times. The set up or architecture of such a computer network, which is also designated as parallel computer, is therefore limited to the expansion of the Uni-Processor-Architecture with a communication interface, which realizes the communication between the single processors, as well as the replication of the expanded Uni-Processor-Architecture.

To set up a known computer network, a number of workstation computers, so-called (computing-) nodes, a special high performance network SAN (System Area Network), which is operated additionally to a standard network LAN (Local Area Network), as well as an operation system for the computing nodes are used. At present, systems with common processors are used as workstation computers or computing nodes in a known computer network. Apart from single processor systems (Uni Processors), small SMP (Symmetrical Multi Processor) systems (Dual Processors) may also be used as node computers. The expansion of the node computers (main memory, hard disks, processors, etc.) further depends to a great extent from the user's demand.

Figure 1:
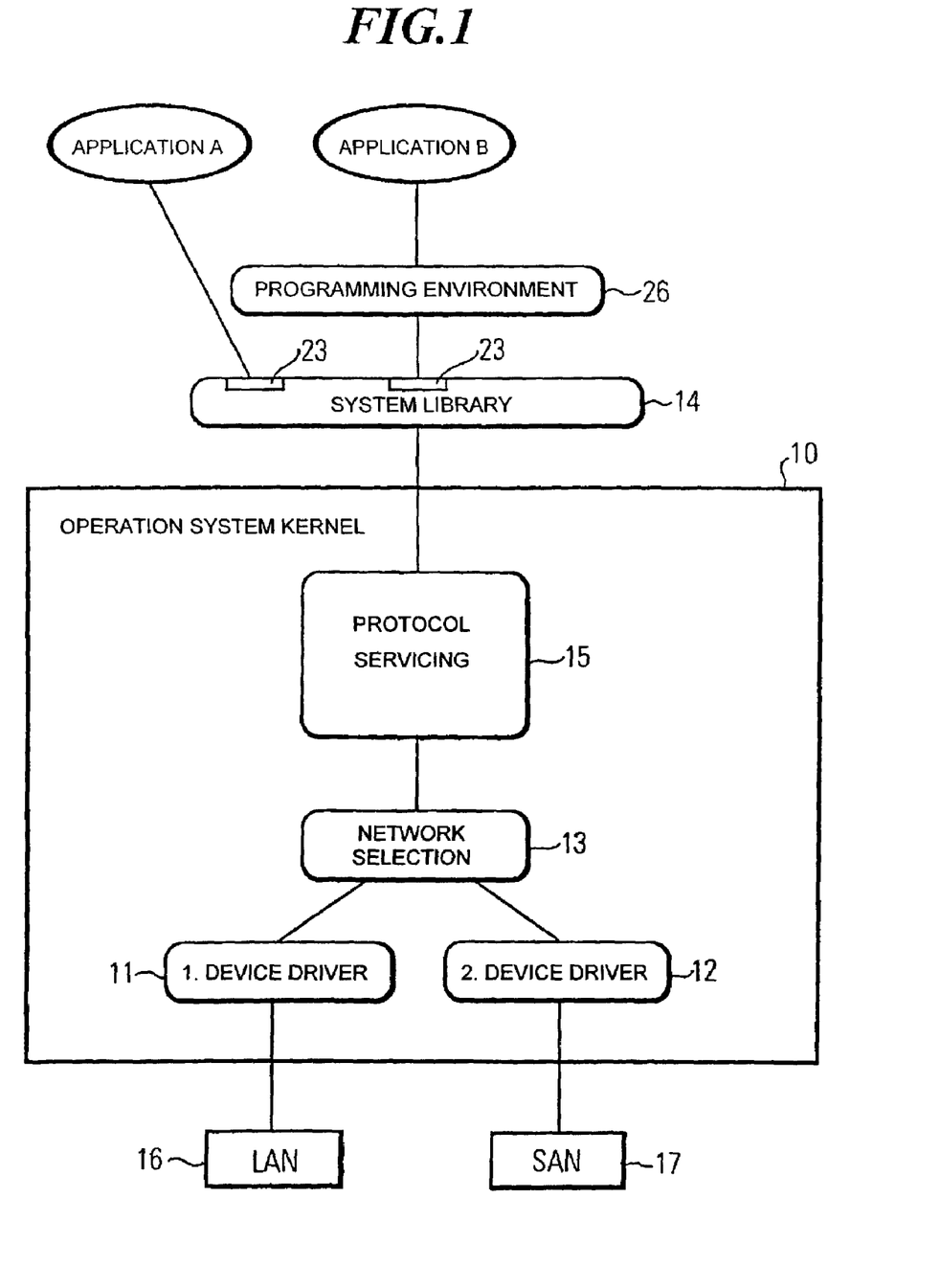
FIG. 1 a schematic diagram of a conventional communication architecture.

The conventional process for integration of a network within the operation system of a single computer is depicted in FIG. 1. Main component in an operation system kernel 10 is a first network specific device driver 11 for the standard network LAN and a second network specific device driver 12 for the high performance network SAN. Both parallel arranged device drivers 11 and 12 are accessed depending on an in advance connected network selection unit 13 and each adjust the network specific communication interface to the interface expected by the network protocols. Specific control of the network as well as its integration is to a great extent hidden from the user. He further uses the communication operations provided by a system library 14 and only after servicing the communication protocols in a protocol unit 15 within the operation system kernel 10, the actual transition to the different communication networks takes place. Therefore, the conventional communication path occurs starting from an application A or B, eventually by using a programming environment 26 via the communication interface 23 of the system library 14, the access to the operation system 10, the servicing of the communication protocols in the protocol unit 15, the network selection in the network selection unit 13, the control via the respective device driver 11 or 12 till the access to the hardware in form of a network card 16 or 17 belonging to the selected network.

In case of corresponding balance between communication—and computing performance, large-scale computers have an essential significance, as shown by their increasing distribution. However, success of computer bundles—as cost-effective alternative to large-scale computers—is up to now rather moderate and limited to special application classes having low communication effort. One reason for this lies in the low to moderate data transfer performance for available communication networks in the LAN sector, which however was removed by the arrival of new high performance networks in the SAN sector. When using such high performance networks, however, it is getting very soon obvious that the conventional communication path anchored in the operation system—as described above—is not able to exhaust also not approximately, the performance potential of the high performance networks. The reason for this lies in the architecture of the communication path itself, as well as in the usage of standardized communication protocols (e.g. TCP/IP), which all were not designed for the needs of parallel processing, but for usage in long-distance networks.

A limited function scope of the networks used in the long-distance field involves mechanisms for path finding, flow control, fragmenting or defragmenting, sequence maintainance, buffer storage, error detection and error handling, which are all included in the functional scope of standardized communication protocols (e.g. TCP/IP). Further, standardized communication protocols often provide functionalities, which are rather troublesome during usage in parallel systems. That are especially fixed packet sizes, large-scale check sum calculations, several protocol layers and a plurality of information in the packet headers. The unavoidable providing of this information costs time, which is undesired delay time from the program developer's perspective. To complicate it, a communication path depicted in FIG. 1 is not able to adjust itself to the functionality of the underlying networks and always assumes a provided minimum scope. Just this leads, when employing special high performance networks, to implementation of already present functionality within the protocol software, which considerably delays its servicing, and decisively hinders the application stuck thereon.

For solving this problem, it is known to use methods for latency time reduction, which focus on eliminating, as far as possible, inefficiencies on the communication path. Thereby, starting points are not only at the employed communication networks, but above all at the employed network protocols, the interaction with the operation system as well as the definition and the substance of the communication interface provided on the application layer. Reduction of communication latency times is based on specific relocation of tasks from higher layers to lower layers of the communication path or communication hardware, which leads to restructuring of the communication path in its entirety.

SUMMARY OF THE INVENTION

The invention is based on the problem to provide a method for controlling a communication of single computers in a computer network, in which the communication latency times are essentially reduced and the data throughput is increased.

According to the invention, this problem is solved by a method according to claim 1. Thereby, it is proceeded from the basic idea to only provide the conventional communication path for the standard network LAN and to provide a second communication path for the high performance network SAN in parallel thereto, which allows direct access of an application to the SAN-communication hardware by, at least to a great extent, bypassing of the operation system so that the communication hardware may be controlled out of the address area of the user. This procedure provides the possibility to completely remove the operation system, as well as the conventional communication protocols, out of the efficiency-critical path of the communication operations. The applications on the user side are at least sitting at a communication interface to a library, in which or immediately after which, a network selection unit selects one of the two networks. Thereby, the network selection occurs before servicing of the protocol, which takes place within the operation system. By this relocation of the selection of the network, which only occurs in a conventional architecture of the communication path between the servicing of the protocol and the device drivers, it is possible, to early reroute the communication connection to the faster additional communication path, i.e. before or immediately after access to the operation system kernel and above all, before servicing of the communication protocols. However, this rerouting only takes place, if the desired communication connection may also be handled via the high performance network and therefore the additional communication path. If this is not the case, the conventional communication path is used by the operation system. It turned out that in this way, efficient parallel processing in a network of coupled workstation computers having high-performance and flexibility may be reached.

BRIEF DESCRIPTION OF THE DRAWINGS

Further details and features of the invention can be seen from the following description with reference to the drawings. It is shown.

DESCRIPTION OF THE PREFERRED EMBODIMENT(S)

First of all, in the following, it is dealt with the base components of a computer network, which uses the inventive method. Conventional PCs are used as single place or node computers, as already described above. Apart from the standard network LAN, the high-performance network SAN is operated, which should comprise an as high as possible transmission capacity of exemplary 1.28 Gbit/s, a multidimensional, free selectable, scaleable network topology as well as a free programmability of the network adapter. Such a high performance network is known as such.

Unix or a derivate is used as operation system of the node computers within the computer network. Further, a system software is necessary to design the computer network out of the common single components. Essentially, the system software comprises the following components:

- a program for controlling the network adapters,
- a device driver for integration of the network adapter into the operation system,
- a base library for controlling and processing the communication connection,
- user libraries for standardized programming-interfaces and -environments,
- a program for set-up, for managing and for controlling the computer network, as well as
- service programs for configuration and administration of the computer network.

Figure 2:
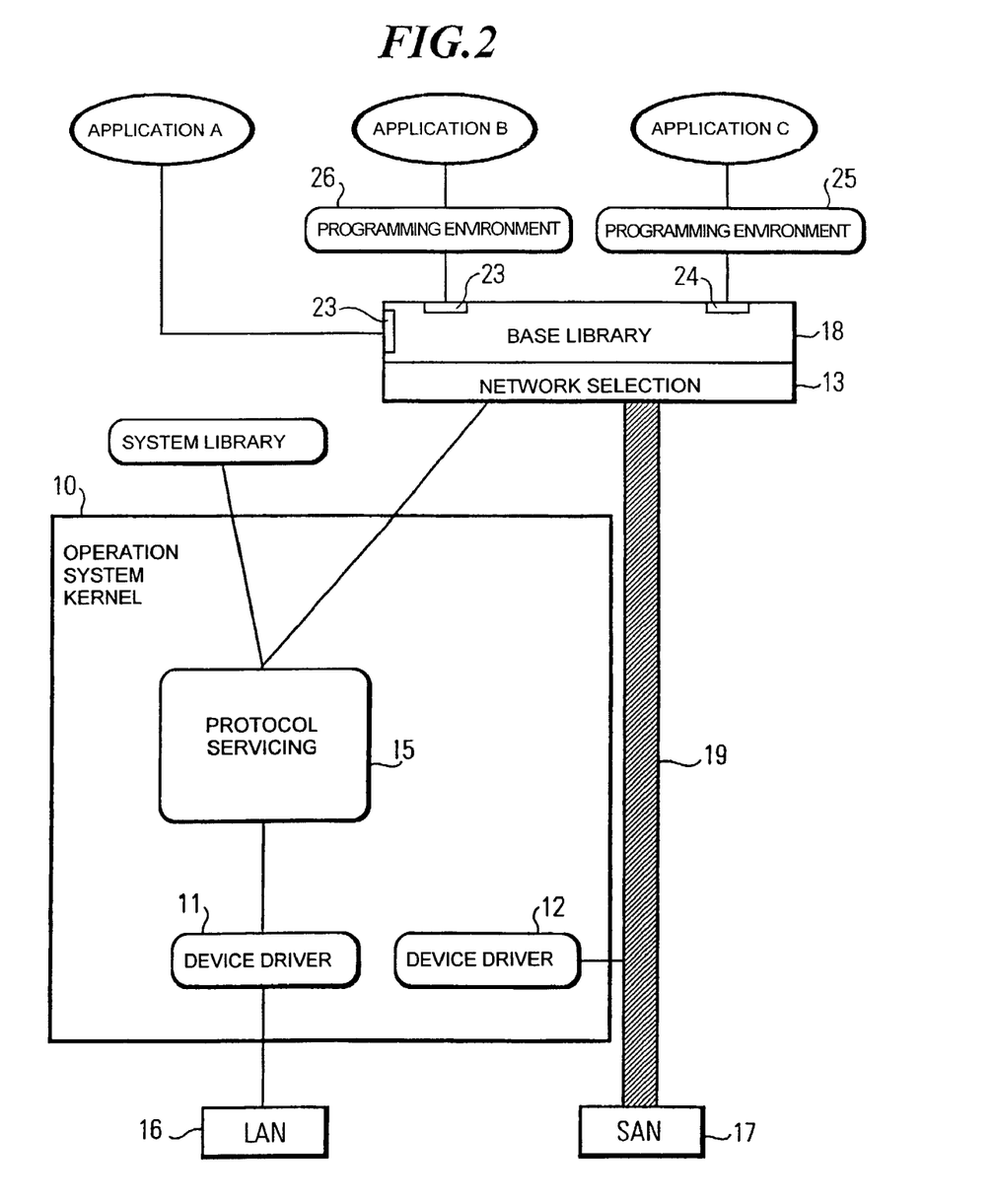
FIG. 2 a schematic diagram of an inventive communication architecture according to a first embodiment, FIG. 3 a schematic comparison of the communication architectures according to FIGS. 1 and 2 with explanation of the amendments according to the method, FIG. 4 a schematic diagram of an inventive communication architecture according to a second embodiment, FIG. 5 a schematic comparison of the communication architectures according to FIGS. 1 and 4 with explanation of the amendments according to the method, FIG. 6 a schematic diagram of an inventive communication architecture according to a third embodiment and FIG. 7 a schematic comparison of the communication architectures according to FIGS. 1 and 6 with explanation of the amendments according to the method.

FIG. 2 shows the schematic representation of a communication architecture according to the invention, whereby functions already explained in connection with FIG. 1 are provided with the same reference numbers. As shown in FIG. 2, three exemplary depicted applications A, B, and C access, eventually by insertion of a programming environment 25 or 26, via communication interfaces 23 or 25, a base library 18, in which a network selection unit 13 is integrated. The network selection unit 13 may either access the protocol unit 15 within the operation system kernel 10, after which the first device driver 11 for the hardware or network card 16 of the standard network LAN is connected. Further, the known system library 14 is assigned to the protocol unit 15.

Alternatively, the network selecting unit 13 may also access a second communication path 19, which directly connects the base library 18, under bypassing of the operation system kernel 10, with the hardware or network card 17 of the high performance network SAN. A device driver 12, which however only executes managing tasks and is not anymore integrated into the actual communication, is as well assigned to the second communication path 19. On the basis of the network selection in or immediately after the base library 18, i.e. before access to the operation system kernel 10, communication connections may already be rerouted at an earlier state to the faster, second communication path 19, and in that way may, under bypassing of the operation system kernel 10, be directly supplied to the high performance network SAN. If a communication connection via the second communication path 19 is not possible, because for example the SAN environment is temporarily not available or the target is only reachable via the LAN environment, it is fallen back to the first communication path, i.e. the operation system communication and the standard network LAN.

The used high performance network SAN should be optimized for the demands of parallel processing. By this, functionality which is usually realized as software, is shifted to the responsibility of the network hardware. Especially, this applies for a) the scalability of the network, which avoids a performance break-in during the increase of connected node computers, b) the path finding within the network, whereby the protocols on higher layers are intensively simplified, c) the loss-free data communication and the sequence maintainance of subsequent packages, whereby flow control mechanisms on higher layers are intensively simplified, d) variable packet sizes, which avoid a waste of bandwidth, as well as e) minimal communication protocols, which manage without much information and reduce the effort for creating the packages.

For providing slim communication protocols, all protocol tasks, which can be relocated directly into network hardware, are relocated there. For example, this is secured data transmission by flow control as well as the sequence-loyalty of packet streams. Further, the available context information is used, to design communication protocols as slim as possible. Especially the fact that a network of parallel computers is a closed network with a known number of nodes and known topology, for example simplifies the path finding and path selecting problematic nature, since all possible paths may be statistically calculated in advance, as well as the identifications of nodes, since all nodes are known in advance and may be provided with a clear identification. Besides, the used protocol is not subjected to compatibility restriction on the basis of communication relations with foreign systems, since no foreign systems exist within the network of parallel designed computers. Altogether, the consequent exploitation of the present system knowledge leads to complete elimination of the protocols for the second communication path 19, which are usually anchored in the operation system kernel.

The multiprocessor-ability, i.e. the ability that several processes may provide communication connections at the same time, which is necessary for the functionality of the computer network, is achieved in the inventive system architecture by corresponding mechanisms within the base library.

From the user's perspective, the existence of standardized communication interfaces is of essential significance, since they allow him, to transfer, without great effort, a plurality of applications on the respective target system. Further, standardized communication interfaces guarantee that applications do not again specially have to be adjusted during change to a new computer generation. For this reason, a programming interface 23 being syntactically and semantically equivalent to an interface of the first communication path or the operation system communication, is according to the invention provided to the user. Based on that, an application A or B can, eventually by using a standardized programming environment 26, service a communication via the base library 18. Further, specially adjusted versions of standardized (MPI=Message Passing Interface) or widely distributed programming environments 25 (PVM=Parallel Virtual Machine) are offered, which interact with the base library 18 via a special interface 24. The programming interface 23 is primarily suitable for applications from distributed data processing in local networks and its transfer to the inventive system. However, the programming environments 25 or 26 PVM and MPI represent the connector to commercial parallel computers and the applications running on them.

Figure 3:
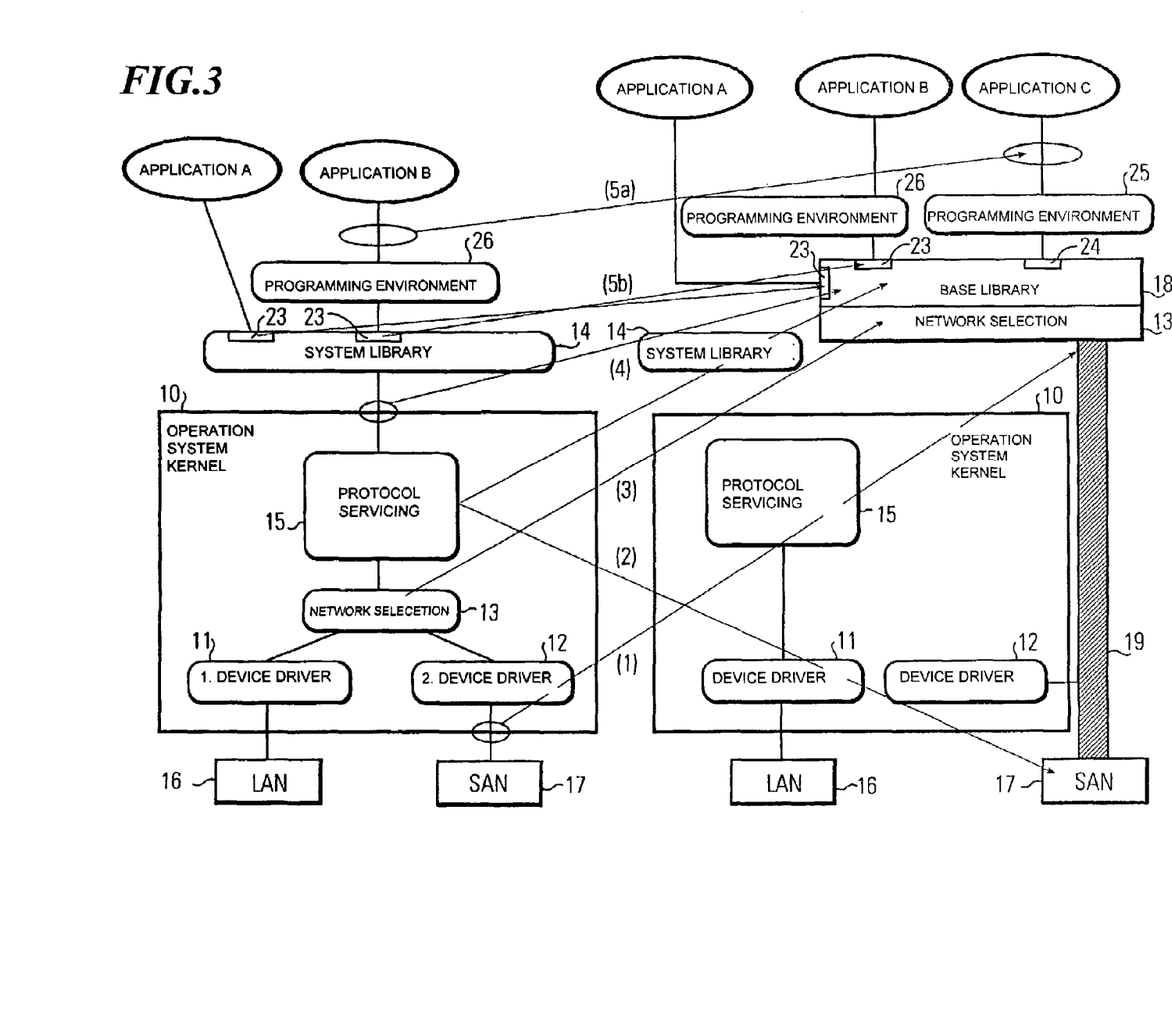

In FIG. 3, on the left side, the conventional communication architecture, as already described by FIG. 1, is directly compared with the inventive communication architecture shown on the right side, as it was described by FIG. 2, whereby arrows going between both diagrams indicate the relocation of single communication-process steps.

Arrow (1) in FIG. 3 describes the relocation of the access to the SAN-network from the lower layers of the operation system directly into the base library 18. In this way, the communication architecture is released from all restrictions, which are usually present within an operation system. By this, the ability of the memory management component being present in the system, to construct logic address fields out of physical memory areas at will, is used. The so-called base principle is used for the communication hardware and can be designated as user-level-communication.

As indicated by arrow (2) in FIG. 3, the produced functionality in the protocols, which was up to now located in the operation system kernel 10, especially the secure data transmission via flow control as well as sequence loyalty of packet streams, is relocated either directly to the SAN-network hardware 17 or to the base library so that the protocols for the second communication path 19, which were up to now located in the operation system kernel 10, may be eliminated. If a programmable network adapter exists for the network hardware 17, it is possible to have the desired functionality exclusively produced by the network. According to the invention, the selection of the network, which is usually located in the operation system kernel between protocol servicing and the device driver, is relocated out of the operation system into the base library 18 (see arrow (3)). Therefore, it is possible to reroute communication connections to the faster second communication path 19, before passing through the operation system kernel.

The mapping of the operation system functionality from the operation system into the base library according to arrow (4) is realized by the multiprocessability of the base library. The procedures for protecting critical program segments and data areas by means of semaphores, which are necessary for this, are as such known from operation system design.

The programming interface 23 of an application is also mapped from the system library to the base library (see arrow (5b)) and further provides equivalent programming environments 25 (see arrow (5a)), which, as far as they are concerned, directly access the base library 18 via the interface 24. Both measures serve, to be able to easier, better and faster transfer applications to the inventive communication architecture.

Figure 4:
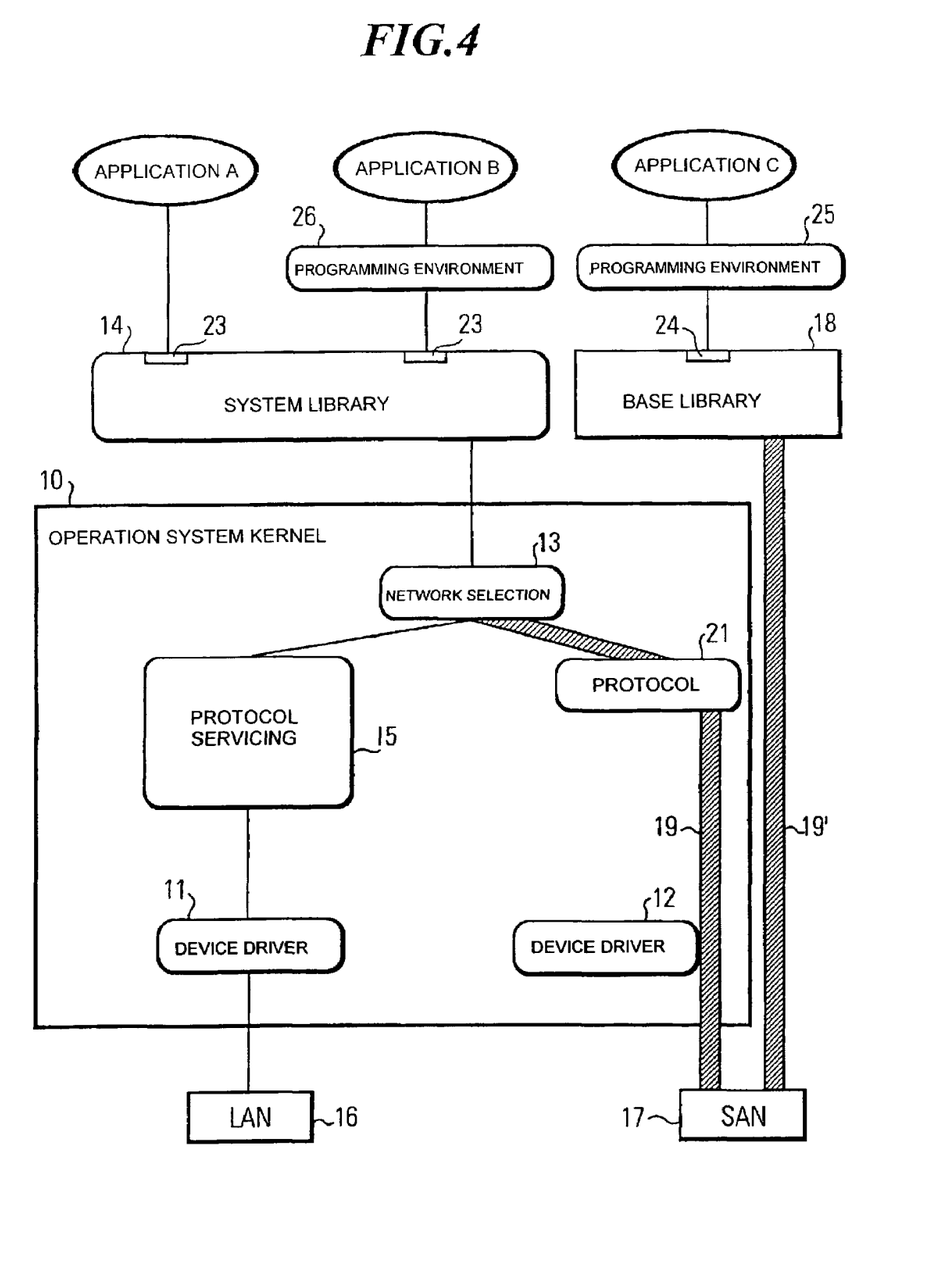

The up to now illustrated communication architecture provides, in contrast to a conventional communication architecture in operation systems, considerable performance advantages, however, also has rather disadvantageous side effects. On the one side, the performance is achieved by a limitation with regard to the security of the communication interface, and on the other side, standard applications, which want to use high speed communication, have to be connected with a special system library. To remove both critical points, the communication architecture depicted in FIG. 4 is suggested. In contrast to FIG. 3, the renewed relocation of the network selection 13 from the library 18 into the operation system kernel 10, however, before the actual access to the protocol processing, guarantees the usual security of the communication interfaces in operation systems, as well as the desired transparency of the communication interface in contrast to the user applications, which now manage without special connection to the base library 18.

FIG. 4 shows in detail a further-developed embodiment of a communication architecture. Applications A and B access, if necessary by inserting a programming environment 26, the system library 14, which is connected after the operation system kernel 10. Directly after access to the operation system 10, the selection between the standard network LAN and the high performance network SAN is made in a network selection unit 13. When the standard network LAN is selected, the communication protocols are serviced in the protocol unit 15, after which the device driver 11 for the LAN-network hardware 16 is connected. When the high performance network SAN is selected, the SAN-network hardware 17 can be directly accessed via a communication path 19. Here, a communication path 19 also includes a protocol layer 21 and a device driver 12, which however only serves management tasks and is not integrated into the actual communication.

In addition to the communication path 19, which connects the system library 14 after network selection immediately after access to the operation system kernel 10 with the SAN-network hardware 17, outside the operation system kernel, a base library 18 is provided, which is accessed by an application C by inserting of a suitable programming environment 25 and which directly accesses the SAN-network hardware 17 via the communication path 19', which is located outside the operation system kernel. In this way, so-called unprivileged communication ends are provided, which allow access to the SAN-network hardware 17 under bypassing of the operation system, but which in contrary to pure user-level communication are subjected to all protection mechanism of the operation system. A very efficient control of the SAN-network hardware 17, however, without bypassing the protection mechanisms of the operation system, results from this. Communication ends are in itself closed and protected units managed and protected by the operation system, which are each exclusively assigned to an application so that different applications use different communication ends, and for example, application A is not able to access an end of an application B, although both communication ends are serviced via the same hardware.

Also in the communication architecture shown in FIG. 4, the requirements for the high performance network SAN and the slim communication protocols described above in connection with FIG. 2 should be realized. Moreover, standardized programming interfaces and standardized or widely used programming environments are also in this case provided.

Figure 5:
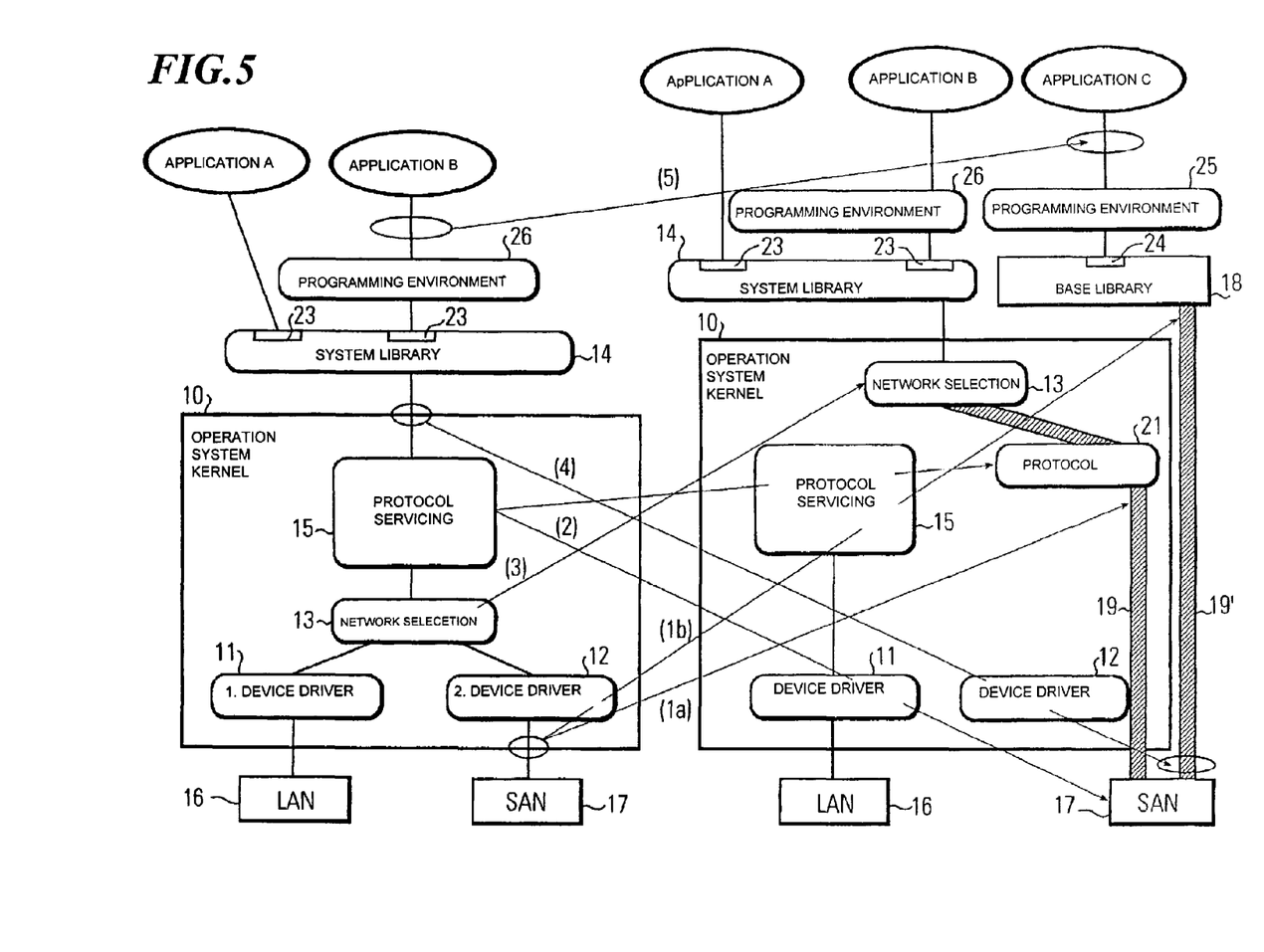

In FIG. 5, the relocation of functionality and access points in comparison between a conventional communication architecture, as described in connection with FIG. 1, and the new communication architecture according to FIG. 4, is shown, whereby arrows going between both diagrams also symbolize the single relocation. The relocation of the access to the SAN-network from lower layers of the operation system into the protocol layer 21 of the communication path 19 within the operation system kernel and/or directly into the address area of an application or into the base library 18 as part of the application, which is indicated by arrows (1*a*) and (1*b*), releases the system from all restrictions, which are usually present within the operation system. Thereby, the ability of the memory management component is used, to construct out of physical memory areas logical address areas at will. In combination with additional functionality within the network adapter, unprivileged communication ends result therefrom.

A large part of the functionality produced in common protocols is relocated according to arrow (2) directly into the SAN-network hardware, as well as into the protocol layer 21 of communication path 19. The things said for the relocation of the protocol functionality in connection with FIG. 2 correspondingly apply here.

According to arrow (3), the selection of the network, which happens in conventional communication architectures between protocol servicing and device driver, is relocated in advance to the actual protocol servicing and in the shown example, immediately after access to the operation system kernel 10 so that communication operations may be early rerouted to the faster communication path 19. Here, however, this rerouting only happens, if the desired communication connection may be handled via the communication path 19. If this is not the case, it is fallen back to the conventional operation system communication. Relocation of functionality out of the operation system into the SAN-network hardware according to arrow (4) is realized by the multiprocessability of the offered communication interface in form of the independent communication ends. The procedure for the protection of memory components, which is necessary for it, is known as such and is performed on the hardware side by the memory management component of the computer.

If applications A and B use the regular communication interface of the operation system, i.e. the system library, integration of high performance communication is completely transparent, based on placing the network selection for this application. However, if known parallel computer-programming environments (PVM or MPI) are employed, further optimization within the communication path are possible. These are supported by offering equivalent or optimized programming environments so that the application interface is relocated to this programming environment, as it is indicated by arrow (5) in FIG. 5.

Figure 6:
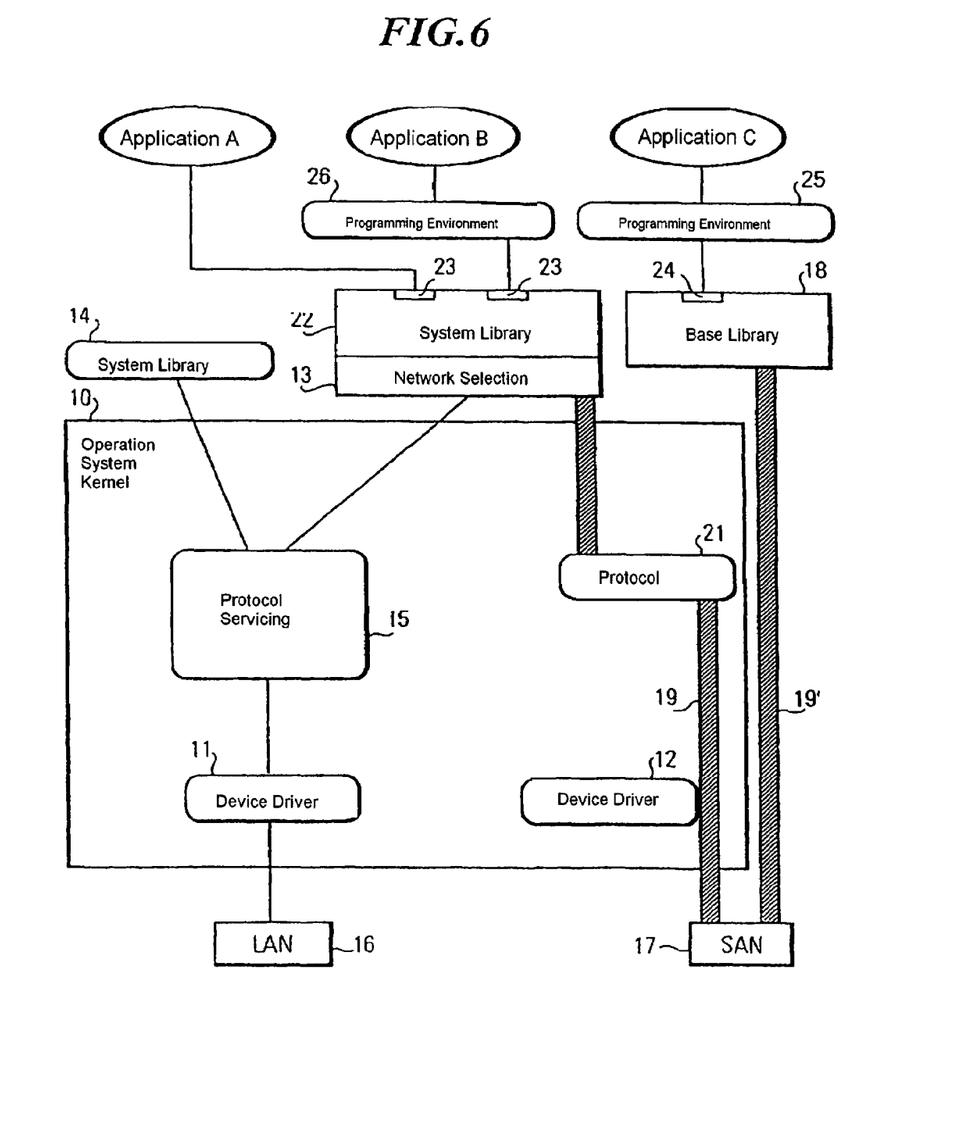
Figure 7:
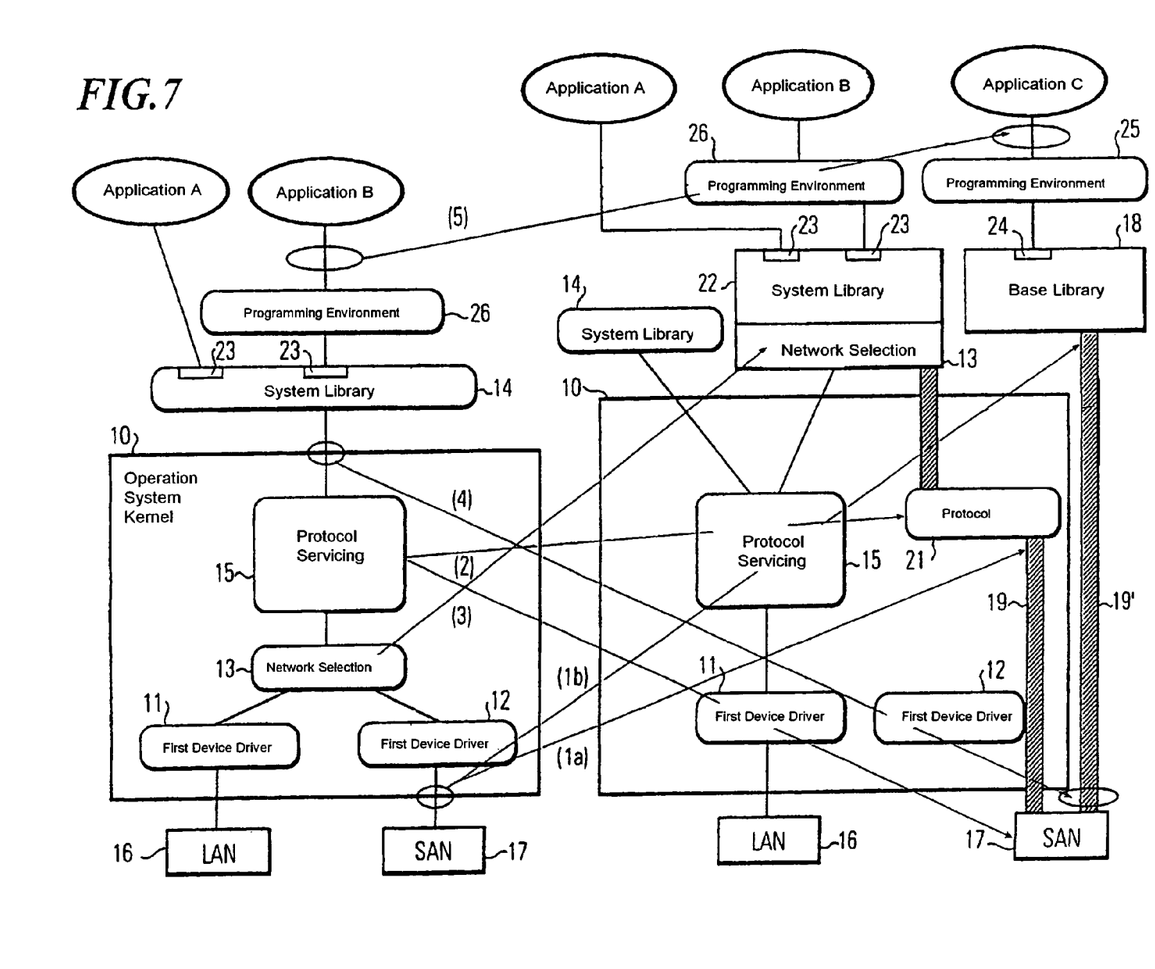

In the communication architecture according to FIG. 4, network selection happens directly after access to the operation system. For this, usually, modifications of the operation system kernel are necessary. If the operation system does not allow to carry out modifications at this position, an alternative communication architecture, as shown in FIG. 6, may be used. Essentially, this architecture differs from the architecture according to FIG. 4, in that the network selection 13 is relocated from the operation system kernel to an in advance located PS-system library 22. This PS-system library 22 essentially unifies the functionality of the conventional system library and the base library and offers the user to the outside the same interfaces as the system library. If an application uses the PS-system library 22 instead of the regular system library 14, which still exists, all internal communication connections are handled—as far as possible—via the SAN-high performance network.

The following amendments additionally result to the relocations of functionality and access points, which were already explained in connection with FIG. 5. The selection of the network (arrow (3)) is now relocated to the PS-system library 22, which thereby provides all functions of the actual system library. The relocation Of the network selection to the PS-system library enables to early reroute communication connections, i.e. before access to the operation system kernel and above all before servicing of the standard protocols, to the faster communication path 19 of the SAN-high performance network. However, also in this connection, this relocation only takes place if the desired communication connection may also be serviced via this communication path 19. Otherwise, it is fallen back to conventional operation system communication.

As already explained in connection with FIG. 5, the programming interface of an application is relocated from the system library to the base library (arrow (5b)) and equivalent programming environments are provided (arrow (5a)), which, as far as they are concerned, directly access the base library.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

We claim:

1. A method for controlling communication of a plurality of single computers in a computer network so as to selectively connect one of said computers to at least one other of said computers by a first communication path connected to a standard network LAN and by a second communication path connected to a high performance network SAN, the high performance SAN being capable of servicing associated communication protocols, the method comprising:

accessing a base library, via a communication interface, said base library being connected in the first and second communication paths before an operation system kernel; and selecting, using a network selection unit that is integrated in the base library, between one of the first communication path to the standard network LAN and the second communication path to the high-performance network SAN, said selecting occurring at a point in the network after the base library and before access to said operation system kernel, wherein said second communication path bypasses said operation system kernel and a protocol unit that is associated with the standard network LAN and located alone the first communication path in the operation system kernel.

2. The method according to claim 1, wherein said second communication path is located outside said operation system kernel.

3. The method according to claim 1, wherein said network selection takes place depending on target addresses given by one or more applications connected to said communication interface.

4. The method according to claim 1, wherein said standard network LAN is accessed, if a communication connection to said high-performance network SAN via said second communication path or said third communication path is not possible.

5. The method according to claim 1, wherein protocol tasks are relocated to the network hardware to provide slimmer communication protocols.

* * * * *

UNITED STATES PATENT AND TRADEMARK OFFICE
CERTIFICATE OF CORRECTION

PATENT NO. : 7,308,509 B2  
APPLICATION NO. : 10/220228  
DATED : December 11, 2007  
INVENTOR(S) : Thomas Warschko and Joachim Blum It is certified that error appears in the above-identified patent and that said Letters Patent is hereby corrected as shown below:

Column 10, Line 6, please delete "after" and replace with --in--.

Column 10, Line 10, please delete "alone" and replace with --along--.

Signed and Sealed this

Fifteenth Day of April, 2008

JON W. DUDAS  
*Director of the United States Patent and Trademark Office*